United States Patent [19]

Michaud et al.

[11] Patent Number: 4,927,900

[45] Date of Patent: May 22, 1990

[54] AROMATIC POLYAMIDOIMIDES HAVING MALEIMIDO END GROUPS

[75] Inventors: Philippe Michaud, Villeurbanne; Yves Camberlin, Caluire, both of France

[73] Assignee: Rhone-Poulenc Chimie, Courbevoie, France

[21] Appl. No.: 328,506

[22] Filed: Mar. 24, 1989

[30] Foreign Application Priority Data

Mar. 24, 1988 [FR] France ............................. 88 04137

[51] Int. Cl.⁵ ............................................. C08G 18/34
[52] U.S. Cl. ..................................................... 528/49
[58] Field of Search ............................................ 528/49

[56] References Cited

U.S. PATENT DOCUMENTS 4,158,731  6/1979  Waterhouse ..................... 528/322

*Primary Examiner*—Maurice J. Welsh

*Attorney, Agent, or Firm*—Burns, Doane, Swecker & Mathis

[57] ABSTRACT

Novel curable aromatic polyamidoimides having maleimido end groups, well adapted as coating solutions or for the production of solid shaped articles, are prepared by the direct interreaction among (i) an aromatic diisocyanate, (ii) a monoanhydride of a tricarboxylic acid and (iii) a monocarboxylic acid bearing a maleimido substituent, and have the following structural formula (I):

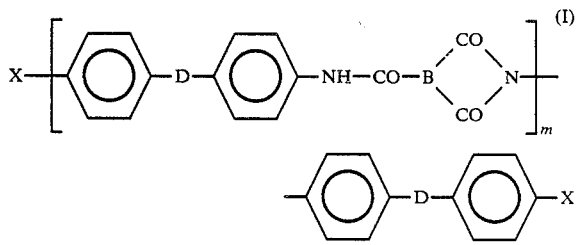

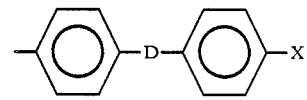

11 Claims, No Drawings

AROMATIC POLYAMIDOIMIDES HAVING MALEIMIDO END GROUPS

CROSS-REFERENCE TO COMPANION APPLICATION

Our copending application, Ser. No. 328,240 filed concurrently herewith and assigned to the assignee hereof.

BACKGROUND OF THE INVENTION

Field of the Invention:

The present invention relates to novel aromatic polyamidoimides comprising maleimido type end groups which may be substituted, if desired, on the carbon atoms of the ethylenic double bond, to a process for the preparation of such functional polyamidoimides, and to the use thereof, particularly for the production of crosslinked polymers.

Description of the Prior Art:

Japanese Application JA-A-61/293,966 describes polyamidoimides containing end groups of the alkenyloxy type, which are prepared by carrying out the following steps, in series: a condensation reaction in solution between in particular, the chloride of a monoanhydride of a tricarboxylic acid, a hydroxylated aromatic primary amine and, if desired, an aromatic diprimary diamine; then an etherification, using an allyl halide, of the hydroxyl end groups of the oligomers formed as the result of the condensation reaction. However, a process of this type presents a number of disadvantages. One of these disadvantages, which is common to most processes where an amino reactant is reacted with an organic carbonyl compound, such as a carboxylic acid anhydride, is in the need to carry out a cyclizing dehydration of the (poly)amides-acids formed as intermediates; in fact, since this reaction is balanced, the water liberated must be removed and this operation cannot generally be carried out to completion in solution. Another disadvantage is associated with the etherification reaction discussed above; this reaction is conducted in the presence of a strong base, such as sodium methylate, and such a condition is not favorable to the stability of the imide rings introduced by the oligomers which are already formed, which can at least partially open and, consequently, can result in degradation of the desired polyamidoimides. Furthermore, the end groups of the alkenyloxy type in these prior art polyamidoimides do not exhibit sufficient reactivity to permit them to be used to advantage in certain applications, such as adhesives.

SUMMARY OF THE INVENTION

Accordingly, a major object of the present invention is the provision of novel polyamidoimides having ethylenically unsaturated functional end groups which have a reactivity which is greater than that of alkenyloxy functional groups, which novel polyamidoimides may be prepared by a process which does not exhibit the above disadvantages and drawbacks to date characterizing the state of this art. In this process, a cyclization and simultaneous polymerization result in the direct formation of linear functional polyamidoimides, accompanied by a release of carbon dioxide, a highly volatile compound which presents no risk of degrading the formed polymer. In addition, in the process of the invention it is not necessary to utilize any etherification reaction during the polymerization. Briefly, the present invention features novel linear aromatic polyamidoimides having maleimido type end groups, substituted, if desired, on the carbon atoms of the ethylenic double bond, and having the following general formula:

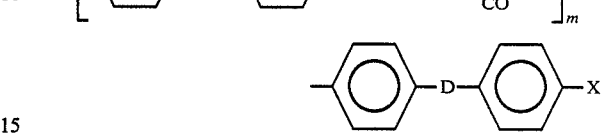

in which each of the symbols D, which are identical, is a single valence bond or one of the groups:

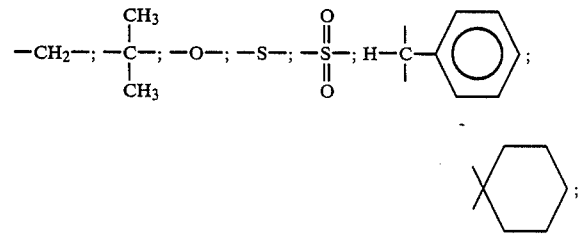

the symbol B is a trivalent radical comprising an aromatic radical containing at least 6 carbon atoms, substituted or unsubstituted, or of two of such radicals linked together by a single valence bond or one of the groups:

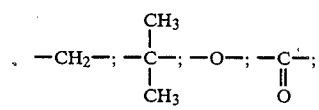

the symbol m is the average number of recurring structural units and is at least equal to 1, preferably ranging from 1 to 10; and each of the symbols X, which are identical, is a radical of the formula:

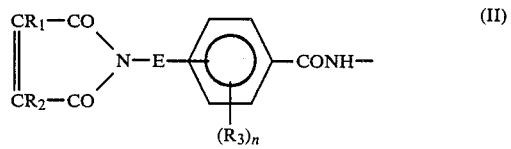

in which each of the symbols $R_1$ and $R_2$, which may be identical or different, is a hydrogen atom or a methyl radical; the symbol $R_3$ is a methyl radical; n is an integer equal to 0, 1, 2 or 3; and the symbol E is a single valence bond or a —$CH_2$— group and is in an ortho, meta or para position relative to the carbon atom of the benzene ring which is linked to the CONH group.

The above polyamidoimides according to the present invention may advantageously be prepared by heating the following reactants (i), (ii) and (iii), at a temperature ranging from 50° C. to 200° C. and in the presence of an organic solvent or a mixture of organic solvents, said reactants being simultaneously reacted:

(i) is a diisocyanate of the formula:

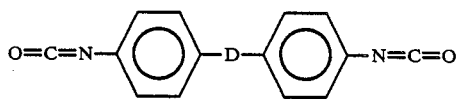

in which D is as defined above in formula (I):

(ii) is a monoanhydride of a tricarboxylic acid of the formula:

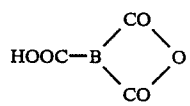

in which B is as defined above in formula (I); and (iii) is a monocarboxylic acid bearing a maleimido substituent (itself substituted, if desired) on the aromatic ring bonded to the carboxyl group and having the formula:

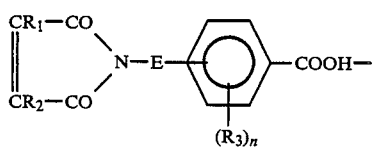

in which the symbols $R_1$, $R_2$, $R_3$, n and E are as defined above in formula (II); with the provisos that the respective proportions of reactants (i) and (ii) are such that the ratio r:

$$\frac{\text{number of moles of diisocyanate (i)}}{\text{number of moles of anhydride (ii)}}$$

ranges from 1.05/1 to 2/1; and the proportion of reactant (iii) is such that the ratio r':

$$\frac{\text{number of moles of maleimidocarboxylic acid (iii)}}{\text{number of moles of diisocyanate (i)} - \text{number of moles of anhydride (ii)}}$$

is equal to 2.

DETAILED DESCRIPTION OF THE PREFERRED EMBODIMENTS OF THE INVENTION

More particularly according to the present invention, exemplary of the diisocyanate (i) of formula (III), particularly representative are:

4,4'-diisocyanato-2,2-diphenylpropane;
4,4'-diisocyanatodiphenylmethane;
4,4'-diisocyanatodiphenylmethane;
4,4'-diisocyanatodiphenyl sulfide;
4,4'-diisocyanatodiphenyl sulfone;
4,4'-diisocyanatodiphenyl ether; and
4,4'-diisocyanato-1,1-diphenylcyclohexane.

4,4'-Diisocyanatodiphenylmethane and 4,4'-diisocyanatodiphenyl ether are the preferred according to the present invention.

Exemplary of the monoanhydrides of tricarboxylic acids (ii) of formula (IV), particularly representative are:

the monoanhydride of trimellitic acid;
the 2,3-monoanhydride of 2,3,6-naphthalenetricarboxylic acid;
the 1,8-monoanhydride of 1,8,4-naphthalenetricarboxylic acid;
the 1,2-monoanhydride of 1,2,5-naphthalenetricarboxylic acid;
the 3,4-monoanhydride of 3,4,4'-diphenyltricaroxylic acid;
the 3,4-monoanhydride of diphenyl sulfone 3,4,3'-tricarboxylic acid;
the 3,4-monoanhydride of diphenyl ether 3,4,4'-tricarboxylic acid;
the 3,4-monoanhydride of 3,4,4'-benzophenonetricarboxylic acid; and
the 3,4-monoanhydride of 3,4,3'-diphenylisopropylidenetricarboxylic acid.

Trimellitic acid anhydride is the preferred according to the present invention.

Exemplary of the monocarboxylic acids bearing a maleimido substituent (itself substituted, if desired) (iii) of formula (V), particularly representative are:

2-maleimidobenzoic acid;
3-maleimidobenzoic acid;
4-maleimidobenzoic acid;
2-citraconimidobenzoic acid;
3-citraconimidobenzoic acid;
4-citraconimidobenzoic acid; and
4-(maleimidomethyl)benzoic acid.

4-Maleimidobenzoic acid and 4-citraconimidobenzoic acid are the preferred according to the present invention.

The monocarboxylic acids (iii) are compounds which are known to this art [cf., particularly, *Chemical Abstracts*, 104, 19508j (1986)]. They may be prepared by reacting, in solution, an aminocarboxylic acid of the formula:

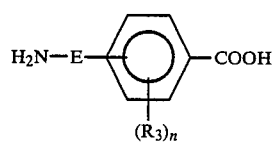

in which the symbols $R_3$, n and E are as defined above in formula (II), with the anhydride of the formula:

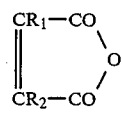

in which the symbols $R_1$ and $R_2$ are also as defined above in formula (II), the reaction being carried out in the presence of acetic anhydride and, optionally, of triethylamine and a nickel salt.

The reaction for preparing the polyamidoimides according to the present invention is carried out in a homogeneous medium by adding to the reactants (i), (ii) and (iii) a solvent or a mixture of solvents which dissolve the reactants and the product formed. Suitable such solvents are polar solvents, in particular N,N-dimethylacetamide, N,N-dimethylformamide, N-methyl-2-pyrrolidone, dimethyl sulfoxide, 1,1,3,3-tetramethylurea, 1,3-dimethylurea and mixtures of these solvents furthermore, they must be perfectly anhydrous.

The proportions of the reactants (i) and (ii) are preferably selected such that the ratio r:

$$\frac{\text{number of moles of diisocyanate (i)}}{\text{number of moles of anhydride (ii)}}$$

ranges from 1.1/1 to 1/5/1.

The polymerization reaction is carried out at a temperature of from 50° C. to 200° C.; the best results are obtained at temperatures of from 80° C. to 190° C.

In practice, the starting reactants, which are used together, are dissolved in the solvent(s), the operation being carried out under heating to a temperature of from 50° C. to 150° C., and preferably from 60° C. to 120° C., and the mixture is then permitted to react, under stirring, at a temperature which is maintained equal to the abovementioned temperature of dissolution, or is increased, if need be, directly or progressively, to a value not exceeding 200° C., and preferably not exceeding 190° for a reaction period which will vary to a large extent as a function of the precise temperature conditions which are adopted. Very preferably, the reaction for the preparation of the polyamidoimides according to the present invention is carried out in the presence of an inhibitor of polymerization of the ethylenic double bonds of the maleimido groups (substituted, if desired). Specific examples of such inhibitors are, in particular, hexaphenylazobenzene, azobenzene, benzoquinone, zinc or copper dimethyldithiocarbamate and triphenyl phosphite.

The amount of inhibitor, when it is indeed used, generally represents from 0.1 to 2% of the total weight of the reactants (i), (ii) and (iii) which are dissolved.

The reaction for preparing the polyamidoimides according to the present invention, furthermore, may be conducted in the presence of a suitable catalyst, if necessary. The catalysts which may be employed, where appropriate, are organic compounds which have no functional groups containing active hydrogen atoms capable of reacting with isocyanate groups. Those which are suitable in this respect are, especially, the tertiary amines belonging to the group of mono- or polycyclic compounds containing at least one intra- and/or extracyclic tertiary nitrogen atom; exemplary of suitable catalysts of this type are I,4-diazobicyclo[2.2.-2]octane, N,N'-dialkylpiperazines, N-alkylmorpholine and N-alkylpiperidine, in which compounds the alkyl radical is a methyl and/or ethyl radical. Metal salts may also be used as catalysts; exemplary thereof are, in particular, dibutyltin dilaurate and cobalt acetylacetone.

When a catalyst is indeed used, its quantity generally represents from 0.1 to 2% of the total weight of the reactants (i), (ii) and (iii) which are dissolved.

Upon completion of the reaction, the polyamidoimide is obtained in the form of a solution. It can be precipitated by adding a nonsolvent or a mixture of nonsolvents to the reaction mixture, and the precipitated polymer may be isolated from the reaction mixture. Suitable nonsolvents are, for example, water, acetone, tetrahydrofuran, toluene or any other liquid which does not dissolve the desired polymer. The polymer can also be obtained by evaporating the solvent(s) from the reaction mixture in a ventilated oven.

In solution form, these functional polyamidoimides are particularly well suited for the manufacture of fibers, or for coating films and insulating varnishes or for adhesives, either while the solvent is being evaporated off, or subsequently. In precipitated form, these polymers are particularly useful for the manufacture of shaped products by injection- or compression-molding techniques.

One advantage of these polyamidoimides is in the fact that, by virtue of their highly reactive maleimido end groups, they can be converted at any time during their processing (preferably after shaping) into crosslinked polymers having excellent mechanical and electrical properties, as well as high chemical inertness at temperatures of 200° C. to 300° C. This crosslinking is carried out merely by heating to a temperature of from 150° C. to 300° C. for a specified time in the presence, if desired, of a radical polymerization initiator or of an anionic polymerization catalyst.

The polyamidoimides according to the present invention can, furthermore, be used in copolymerization reactions with one or more other compound(s) containing groups capable of reacting with the reactive double bonds of the maleimido end groups.

In order to further illustrate the present invention and the advantages thereof, the following specific examples are given, it being understood that same are intended only as illustrative and in nowise limitative.

EXAMPLE 1

Example according to the present invention:

The following materials were introduced in succession into a 250-cm$^3$ glass reactor fitted with an anchor-type central stirrer and a vertical condenser, in which a slight excess pressure of dry nitrogen was established and which was preheated to 100° C. with the aid of a suitable oil bath:

(i) 11.7 g (0.0609 mole) of monoanhydride of trimellitic acid;

(ii) 18.3 g (0.0732 mole) of 4,4'-diisocyanatodiphenylmethane;

(iii) 5.34 g (0.0246 mole) of 4-maleimidobenzoic acid;

(iv) 0.27 g of benzoquinone; and (v) 70 g of N-methyl-2-pyrrolidone.

The reaction was permitted to proceed for 3 hours, 45 minutes, under stirring, while the temperature of the reaction mixture was maintained at 100° C.

The polymer solution thus obtained was a dark red-colored liquid mass weighing 99 g (it contained 29.1 g of polymer). No NCO functional groups were detected by infrared analysis.

The polymer which had thus been prepared in solution form corresponded essentially to the following formula:

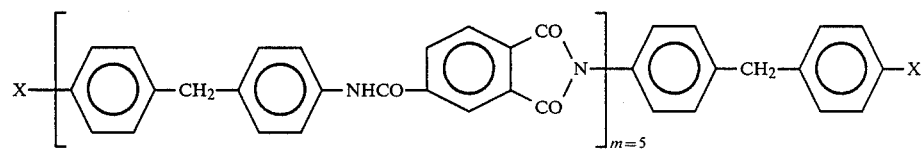

with X = 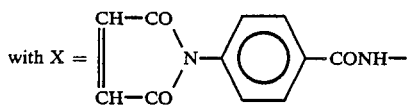

The polymer solution obtained was used to coat a plate of E-type glass, weighing 50 g/m² and sized with the τ-aminopropyltriethoxysilane marketed by Union Carbide under the trademark Silane $A$ 1100. This impregnated plate was dried using a drying procedure entailing 8 operations of 5 minutes each at 120° C. The supported adhesive thus obtained was then pressed between two stainless steel test specimens, the dimensions of which were those specified in ASTM Standard 1002, the operation being carried out at 230° C. for 15 minutes and at a holding pressure of 0.5 MPa. At the end of this time, the pressure was released and the test specimens were placed in a ventilated oven, at a temperature of 250° C., for a period of 1 hour. These test specimens were then broken using a tearing test according to ASTM Standard 1002. The stress values at failure were the following: mean value= 21.3 Mpa; maximum value=23 Mpa.

2. Description of the process for the preparation of the 4-maleimidobenzoic acid starting material:

The following materials were introduced simultaneously, over 10 minutes, into a stirred reactor fitted with a vertical condenser and preheated to 60° C. with a suitable oil bath:

(i) 50 g (0.365 mole) of 4-aminobenzoic acid in solution in 100 cm³ of acetone; and (ii) 39.4 g (0.402 mole) of maleic anhydride in solution in 39.4 cm³ of acetone.

The reaction was permitted to proceed for 20 minutes under stirring. At the end of this time, the following materials were introduced successively:

(iii) 12.3 g (0.122 mole) of triethylamine;

(iv) 0.4 g of nickel acetate; and (v) 44.7 g (0.438 mole) of acetic anhydride.

The reaction was permitted to proceed at 60° C. for 3 hours, 15 minutes, under stirring. At the end of this time, the mixture was cooled to 20° C., which caused a beige precipitate to form. The product was precipitated completely by adding 500 cm³ of iced water. After drying at 50° C. under $53 \times 10^2$ Pa for 12 hours, 68.7 g of a white product were obtained, exhibiting a melting point of 230° C., measured by differential thermal analysis, and having a structure consistent with that of 4-maleimidobenzoic acid according to the proton NMR analyses which were carried out.

EXAMPLE 2

The procedure was as indicated above in Example 1, but starting with the following reactants:

(i) 29.25 g (0.152 mole) of monoanhydride of trimellitic acid;

(ii) 45.75 g (0.183 mole) of 4,4'-diisocyanatodiphenylmethane;

(iii) 13.45 g (0.062 mole) of 4-maleimidobenzoic acid;

(iv) 0.675 g of benzoquinone; and (v) 1.75 g of N-methyl-2-pyrrolidone.

The reaction was permitted to proceed for 4 hours, 30 minutes.

The polymer solution thus obtained was a dark red colored liquid mass weighing 248 g (it contained 73 g of polymer). No NCO functional group was detected by infrared analysis.

The polymer which had thus been prepared in solution form corresponded essentially to the formula given in Example 1, in which the symbol m was also equal to 5.

The polyamidoimide was precipitated by adding water to the solution in which it was dissolved. For this purpose, 50 g of such solution were introduced gradually, under stirring, into 500 cm³ of water. The precipitate obtained was filtered off, washed with water, and it was then dried at 100° C. for 24 hours under a vacuum of $53.2 \times 10^2$ Pa. The powder obtained was next finely ground and screened in order to retain particles smaller than 200 μm, and it was then heated to 200° C. for 2 hours.

This powder, screened and heated as indicated above, was introduced in an amount of 7.5 g into a cylindrical mold (diameter: 5 cm) and the entire assembly was placed between the two circular platens of a press (these platens were adapted to the size of the mold and preheated to 300° C.), to which a pressure of 14.7 MPa was applied. When the temperature of the material had reached 300° C., the entire assembly was maintained under these conditions for an additional 1 hour. The mold and its contents were then o allowed to cool for 12 hours under a pressure of 1 MPa. After demolding, a cylindrical object (diameter 5 cm, height 3 mm) was obtained, which had the following flexural mechanical characteristics (measured according to the data of ASTM Standard D 790M; range=35 mm):

(a) flexural strength 155 MPa, (b) flexural modulus: 3,100 Mpa.

EXAMPLE 3

The procedure was as indicated above in Example 1, but starting with the following reactants:

(i) 29.3 g (0.1172 mole) of 4,4'-diisocyanatodiphenylmethane;

(ii) 18.7 g (0.0974 mole) of monoanhydride of trimellitic acid;

(iii) 0.14 g (0.0396 mole) of 4-citraconimidobenzoic acid;

(iv) 0.09 g of benzoquinone; and (v) 133 g of N-methyl-2-pyrrolidone.

The reaction was permitted to proceed for 6 hours, with satisfactory stirring, the temperature increase cycle shown below being observed:

(a) 3 hours at 100° C.; then (b) 3 hours at 185° C.

The syrup thus obtained was a brown-colored liquid mass weighing 180 g (it contained 47 g of polymer). No anhydride and NCo functional groups were detected in the syrup by infrared analysis.

The operations of precipitation of the syrup in water, of washing and of drying of the precipitate formed were identical with those described in Example 2. A beige powder was obtained, which was then finely ground and screened (particles below 200 μm).

The polymer which had been prepared in powder form corresponded essentially to the following formula:

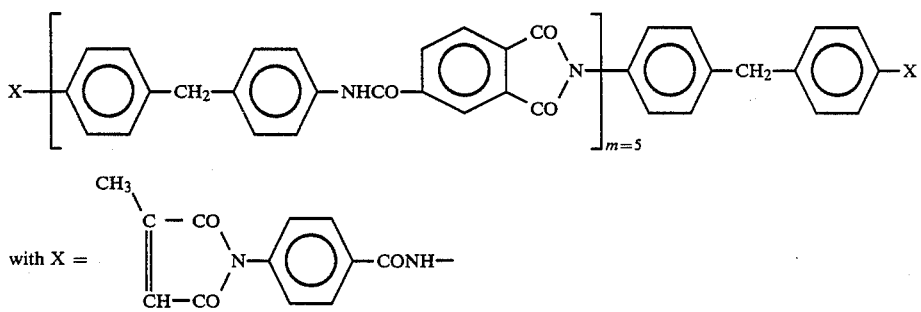

This powder was compression-molded according to the operating procedure described in Example 2. After demolding, a cylindrical molded object (diameter 5 cm, height 3 mm) was obtained, which had the following flexural mechanical characteristics (measured according to the data of ASTM Standard D 790M; range 35 mm):

(a) flexural strength: 80 MPa,
(b) flexural modulus: 3500 MPa.

2. Description of the process for the preparation of the 4-citraconimidobenzoic acid starting material:

The procedure was as indicated in Example 1, but starting with the following reactants:

(i) 50 g (0.365 mole) of 4-aminobenzoic acid in solution in 100 cm³ of acetone; and
(ii) 45 g (0.402 mole) of citraconic anhydride in solution in 45 cm³ of acetone.

The reaction was permitted to proceed for 25 minutes under stirring.

At the end of this time, the following materials were introduced successively:

(iii) 12.3 g (0.122 mole) of triethylamine;
(iv) 0.4 g of nickel acetate; and
(v) 44.7 g (0.438 mole) of acetic anhydride.

The reaction was permitted to proceed at 60° C. for 3 hours, 15 minutes, under stirring. The precipitation of the product in water and the washing and the drying of the precipitate formed were identical with the operations described in Example 1. 57 g of a light-yellow product, which contained 20 mol % of N-(4-carboxyphenyl)citraconamic acid and 80 mol % of 4-citraconimidobenzoic acid, were obtained. 50 g of this product were purified by neutralization of N-(4-carboxyphenyl)citraconamic acid with 5 g (0.0595 mole) of sodium hydrogen carbonate in 300 g of acetone.

After addition of 400 cm³ of water, the desired acid was extracted with 400 g of ethyl acetate, was concentrated using a rotary evaporator at 53×10² pa at 50° C., and was then recrystallized from acetone. After filtering and drying at 100° C., at 53×10² Pa, 22 g of a light-yellow solid were obtained, exhibiting a melting point of 190° C., measured by differential thermal analysis, and having a structure consistent with that of 4-citraconimidobenzoic acid, according to the proton NMR analyses which were carried out.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A linear aromatic polyamidoimide having maleimido end groups and having the following general formula:

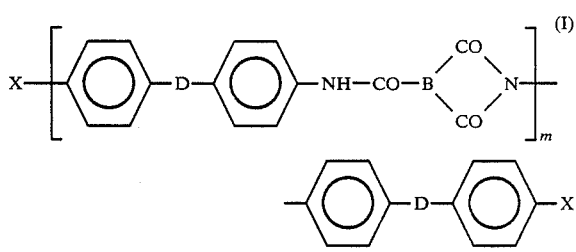

in which each of the symbols D, which are identical, is a single valence bond or one of the groups:

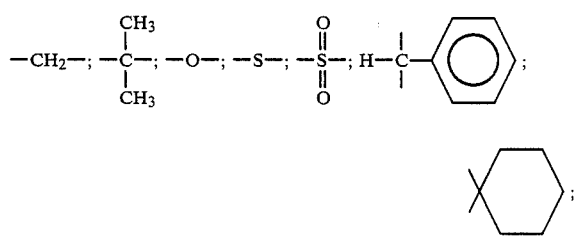

the symbol B is a trivalent radical comprising an aromatic radical containing at least 6 carbon atoms, substituted or unsubstituted, or of two such radicals linked together by a
single valence bond or one of the groups:

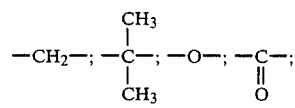

the symbol m is the average number of recurring structural units and is at least equal to 1; and each of the symbols X, which are identical, is a radical of the formula:

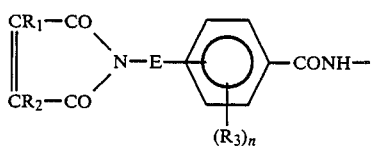 (II)

in which each of the symbols $R_1$, $R_2$, which may be identical or different, is a hydrogen atom or a methyl radical; the symbol $R_3$ is a methyl radical; n is an integer equal to 0, 1, 2 or 3; and the symbol E is a single valence bond or a —CH$_2$— group and is in an ortho, meta or para position relative to the carbon atom of the benzene ring which is linked to the CONH group.

2. A process for the preparation of the aromatic polyamidoimide as defined by claim 1, comprising heating and simultaneously reacting the following reactants (i), (ii) and (iii) at a temperature ranging from 50° C. to 200° C. and in the presence of an organic solvent or mixture of organic solvents:

(i) is a diisocyanate of the formula:

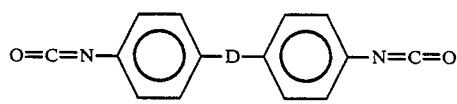 (III)

in which D is as defined in formula (I);

(ii) is a monoanhydride of a tricarboxylic acid of the formula:

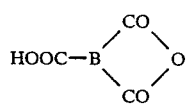 (IV)

in which B is as defined in formula (I); and (iii) is a monocarboxylic acid bearing a maleimido substituent on the aromatic ring bonded to the carboxyl group and having the formula:

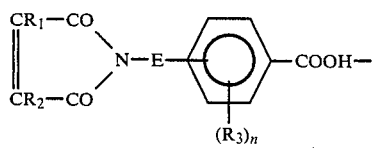 (V)

in which the symbols $R_1$, $R_2$, $R_3$, n, and E are as defined in formula (II); with the proviso that the respective proportions of the reactants (i) and (ii) are such that the ratio r:

$$\frac{\text{number of moles of diisocyanate (i)}}{\text{number of moles of anhydride (ii)}}$$

ranges from 1.05/1 to 2/1; and the proportion of the reactant (iii) is such that the ratio r':

$$\frac{\text{number of moles of maleimidocarboxylic acid (iii)}}{\text{number of moles of diisocyanate (i) } - \text{ number of moles of anhydride (ii)}}$$

is equal to 2.

3. The process as defined by claim 2, said diisocyanate (i) of formula (III) comprising 4,4'-diisocyanato-2,2-diphenylpropane; 4,4'-diisocyanatodiphenylmethane; 4,4'-diisocyanatobiphenyl; 4,4'-diisocyanatodiphenyl sulfide; 4,4'-diisocyanatodiphenyl sulfone; 4,4'-diisocyanatodiphenyl ether; or 4,4'-diisocyanato-1,1-diphenylcyclohexane.

4. The process as defined by claim 2, said monoanhydride of a tricarboxylic acid (ii) of formula (IV) comprising the monoanhydride of trimellitic acid; the 2,3-monoanhydride of 2,3,6-naphthalenetricarboxylic acid; the 1,8-monoanhydride of 1,8,4-naphthalenetricarboxylic acid; the 1,2-monoanhydride of 1,2,5-naphthalenetricarboxylic acid; the 3,4-monoanhydride of 3,4,4'-diphenyltricarboxylic acid; the 3,4-monoanhydride of diphenyl sulfone 3,4,3'-tricarboxylic acid; the 3,4-monoanhydride of diphenyl ether 3,4,4'-tricarboxylic acid; the 3,4-monoanhydride of 3,4,4'-benzophenonetricarboxylic acid; or the 3,4-monoanhydride of 3,4,3'-diphenylisopropylidenetricarboxylic acid.

5. The process as defined by claim 2, said monocarboxylic acid (iii) bearing a maleimido substituent of formula (V) comprising 2-maleimidobenzoic acid; 3-maleimidobenzoic acid; 4-maleimidobenzoic acid; 2-citraconimidobenzoic acid; 3-citraconimidobenzoic acid; 4-citraconimidobenzoic acid; or 4-(maleimidomethyl)benzoic acid.

6. The process as defined by claim 2, said starting reactants (i), (ii) and (iii) being dissolved together in an organic solvent or in a mixture of organic solvents, and said reaction being initially carried out at a temperature of from 50° C. to 150° C.

7. The process as defined by claim 2, carried out in a solvent comprising N,N-methyl-2-pyrrolidone, dimethyl sulfoxide, 1,1,3,3-tetramethylurea, 1,3-dimethylurea, or mixture thereof.

8. A solution comprising the aromatic polyamidoimide as defined by claim 1.

9. A solid shaped article comprising the aromatic polyamidoimide as defined by claim 1.

10. The aromatic polyamidoimide as defined by claim 1, in crosslinked state.

11. A copolymer comprised of an aromatic polyamidoimide comonomer as defined by claim 1.

* * * * *